Sept. 20, 1955 M. S. SISULAK 2,718,159
TWO-SPEED DRIVE
Filed May 4, 1953 3 Sheets-Sheet 1

INVENTOR.
Michael S. Sisulak
BY Paul O. Pippel
Atty.

Sept. 20, 1955 M. S. SISULAK 2,718,159
TWO-SPEED DRIVE
Filed May 4, 1953 3 Sheets-Sheet 2

INVENTOR.
Michael S. Sisulak
BY Paul O. Pippel
Atty.

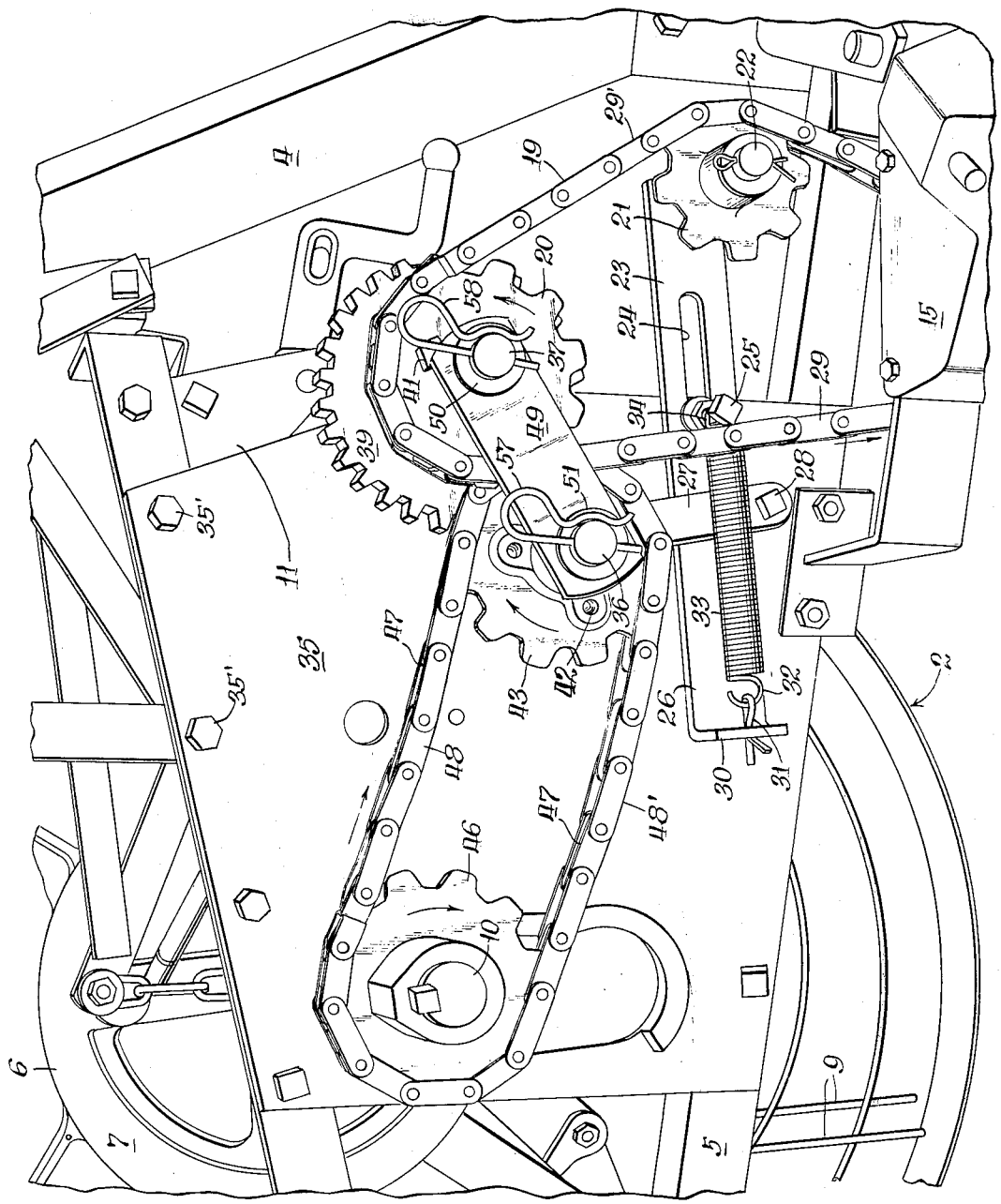

United States Patent Office 2,718,159
Patented Sept. 20, 1955

2,718,159

TWO-SPEED DRIVE

Michael S. Sisulak, Chicago, Ill., assignor to International Harvester Company, a corporation of New Jersey Application May 4, 1953, Serial No. 352,644

8 Claims. (Cl. 74—722)

This invention relates to combined side delivery hay rakes and tedders and more specifically to a novel power transmitting mechanism for rotating the rake mechanism at a selected speed in one direction for raking and in a reverse direction at a higher speed for tedding.

The invention contemplates a novel power transmission particularly adaptable to ground drive operation wherein the various elements of the transmission are so disposed as to effect most efficient power transmission to minimize friction losses and the like and which is of simple and rugged construction and which is readily settable in either raking or tedding position.

A further object is the provision of a simplified two-speed reversible power transmitting mechanism which is especially useful in combined side delivery hay rakes and tedders.

A further object is the provision of a novel arrangement of sprockets and sprocket chains in conjunction with reversing gears to transmit power in a forward and reversed direction at different speeds.

A further object is the provision of a simple inexpensive clutching mechanism.

These and other objects of the invention will become more apparent from the specification and the drawings wherein;

Figure 4 is a view similar to Figure 3 and showing the transmission in higher speed transmitting position for tedding.

Figure 1:
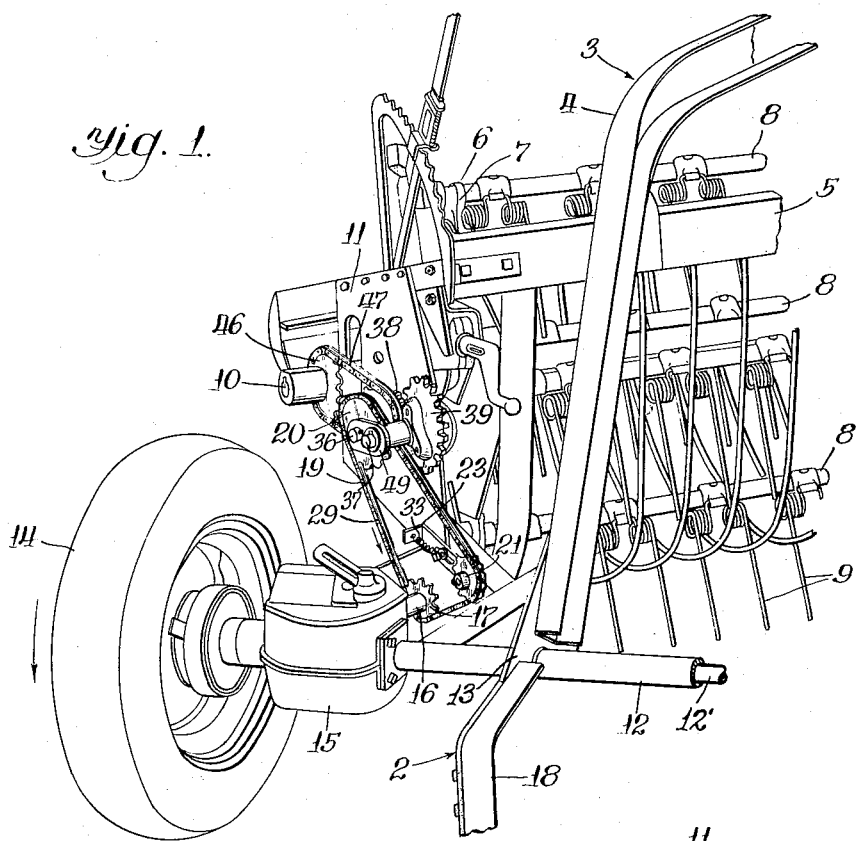
Figure 1 is a fragmentary front perspective view of a conventional hay rake incorporating the invention.

Describing the invention in detail, the side delivery rake and hay tedder generally designated 2, includes a frame 3, comprising a longitudinal side frame member 4 at each side. The frame structure 3 pivotally supports a rake cylinder supporting frame 5 which may be of generally rectangular construction as well known to those skilled in the art. The frame 5 carries a rake cylinder designated 6 which includes a plurality of laterally spaced spiders 7, only one of which is shown, the spiders being connected to carrying bars 8, Figure 1, each of which supports a plurality of rake teeth 9 in the usual manner. The spiders 7 are fixed to a rotatable reel shaft 10 extending the length of the supporting frame 5. The shaft 10 is suitably journalled for rotation at each end of the supporting frame 5. One end of the reel shaft 10 is carried by a downwardly depending platelike bracket member 11 rigidly fastened to the supporting frame 5.

Forwardly of the rake cylinder 6, the frame structure 3 is carried by a transverse tube 12 through bracket members 13, and the tube 12 rotatably carries an axle 12' therein, which at each end is fixed to a ground engaging wheel 14, only one of which is shown. The axle 12' through suitable conventional gearing in a gear box 15, such as shown in Figure 6 of U. S. Patent 2,491,211 to E. L. Rietz, affords a power transmission means with a triangularly extending stub or driving shaft 16 extending from the gear box 15 to which is fixedly secured a driving sprocket 17 (Fig. 1). It is to be understood that the shaft 16 and the driving sprocket 17 will only rotate in one direction when the side delivery rake and hay tedder 2 is drawn forwardly by the draft means 18 which are connected to the brackets 13.

Figure 3:
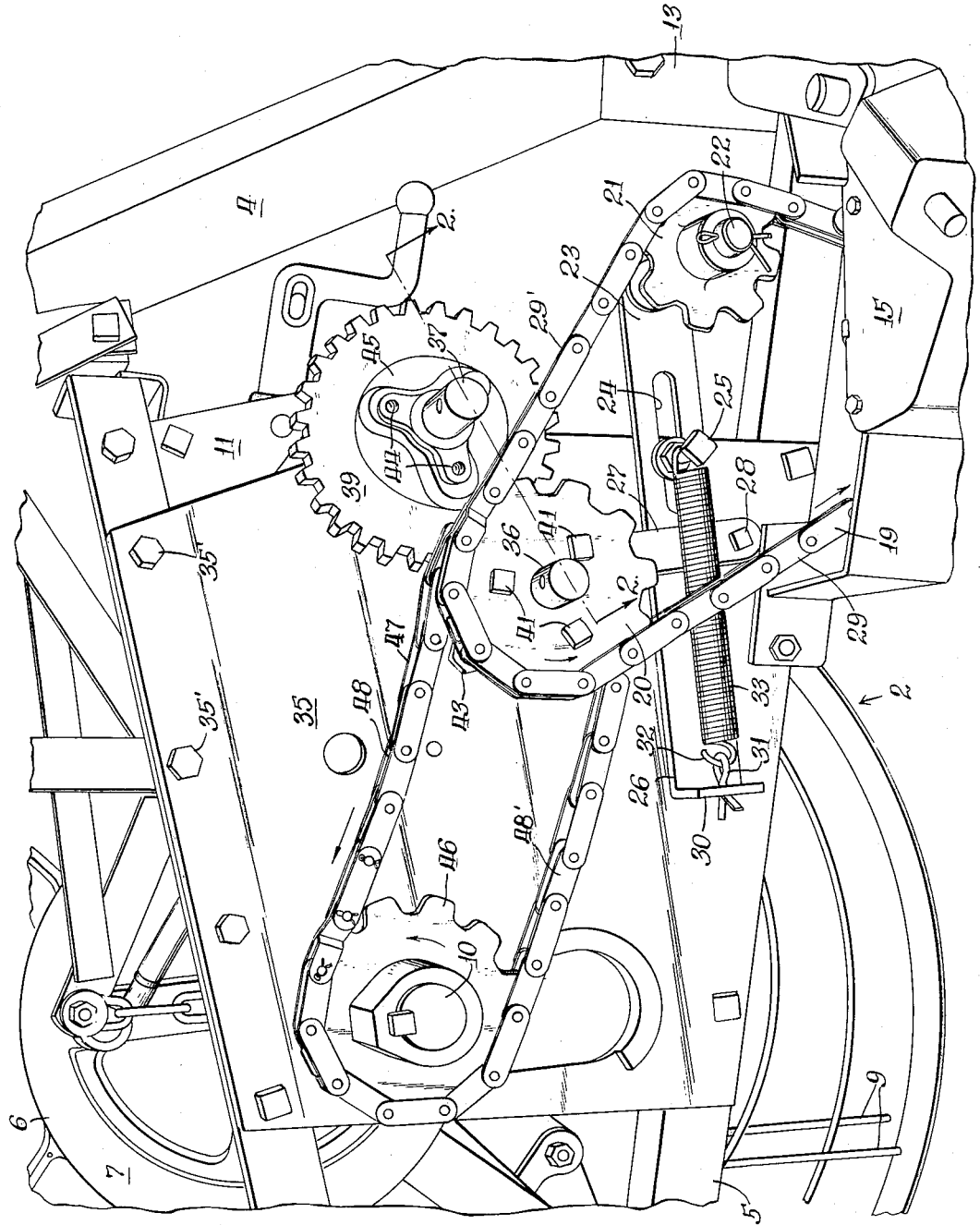
Figure 3 is a fragmentary side perspective view of the rake illustrating part of the drive mechanism in raking position.

Sprocket 17 drives a sprocket chain 19 which is trained about a driven sprocket 20 and an idler sprocket 21, the idler sprocket 21 being revolvable on a countershaft 22 fixed to one end of a movable standard 23 which comprises a longitudinal slot 24 receiving a guiding bolt 25 therethrough, the bolt 25 being secured to the bracket 11. It will be seen from a consideration of Figures 3 and 4 that the slot 24 is disposed intermediate the ends of the standard 23 and elongated lengthwise thereof and that the opposite end 26 of the standard 23 guidedly passes through a loop or strap 27 which is secured to the bracket or plate 11 by means of bolts 28. The standard 23 lays on its inner side against the outer face of the bracket 11 and at its end 26 has an outturned lug 30 to which is secured an eye 31 receiving and hooking onto one end 32 of a spring 33, the other end 34 of the spring 33 being hooked about the bolt 25 and the spring 33 being in tension between the eye 31 and the bolt 25 and constantly urging the standard or carrier element 23 to the right as seen in Figures 3 and 4 to tension the chain 19 between the sprockets 16 and 20. It will be appreciated that the sprockets 16, 20 and 21 are disposed in a common plane and that the loaded stretch 29 of the chain 19 extends substantially straight between the sprockets 16 and 20, and the return length 29' of the chain 19 passes around the idler 21 and the chain 19 assumes a triangular travel path.

A mounting plate 35 is secured to the outer side of the bracket 11 as by bolts 35' and the plate 35 carries a pair of countershafts 36 and 37 which are fixedly secured thereto and positioned generally parallel to the shafts 16 and 10. A pair of meshing gears 38 and 39 are revolvably supported on the countershafts 36 and 37 respectively, the gear 39 being of large diameter and the gear 38 of small diameter.

Figure 2:
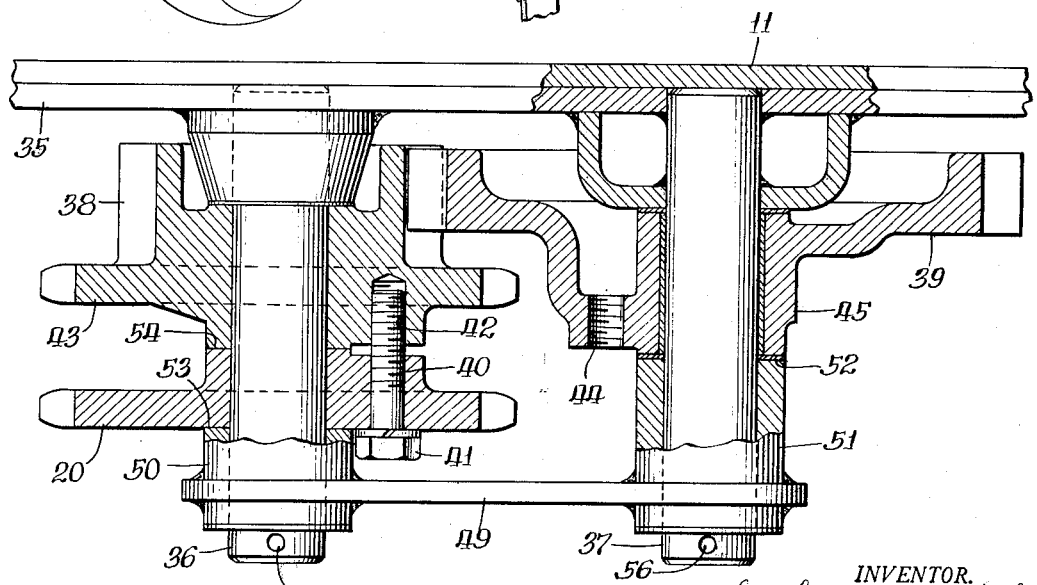
Figure 2 is a radial section substantially taken in the plane indicated by the line 2—2 of Figure 3 and showing the strap applied.

It will be appreciated from a consideration of Figures 2, 3, and 4 that the sprocket 20 is selectively positionable either on the countershaft 36 or the countershaft 37 and that the sprocket 20 comprises a clutch element including a series of axial apertures 40 through which threaded members or clutch means 41 are adapted to be inserted, the apertures 40 being arranged to register, when the sprocket 20 is on the countershaft 36, with apertures or clutch elements 42 which extend axially of an output sprocket 43 which is secured or formed integral with the gear 38 and revolves therewith about the shaft 36.

When the sprocket 20 is positioned on the shaft 37 as best seen in Figure 4, the bolts 41 pass through the apertures 40 and align and thread into clutch or interlocking or interconnecting elements or axial threaded apertures 44 in the hub 45 of the large diameter gear 39.

The gearing is illustrated in Figure 3 in the low speed position for driving the wheel shaft 10 in one direction for raking and this is accomplished through the driving connection between the sprocket 43 and a sprocket 46, secured or keyed to the shaft 10, through the medium of a sprocket chain 47 trained about the sprockets 43 and 46. The chain 19, as seen in Figure 1, moves in the direction shown by the arrow driving the sprocket 20 in a counterclockwise direction which through the clutch means 40, 41 and 42 drives the sprocket 43 in the same direction which through the chain 47 also drives the sprocket 46 and the shaft 10 in a counterclockwise direction, thus driving the reel in the same direction for raking.

In order to position the transmission to convert the rake into a tedder, the bolts 41, 41 are removed to disconnect the sprocket 20 from the sprocket 43 and the sprocket 20 is then positioned on the shaft 37 and the bolts 41 threaded into the apertures 44. Drive is then transmitted from the chain 19 to the driven sprocket 20 driving it in a counterclockwise direction which in turn drives the large gear 39 in a counterclockwise direction which in turn drives the gear 38 and the sprocket 43 in a clockwise direction so that the chain has its upper run 48 moving to the right as seen in Figure 4 and its lower run 48' moving to the left and driving the sprocket 46 in a clockwise direction thereby driving the shaft 10 and the rake reel in the same direction. A multiplication or increased speed is obtained because of the difference in diameters between the gears 39 and 38 and the direction is reversed to that previously described in conjunction with the raking operation.

It will be seen from a consideration of Figures 2 and 4 that the outer extremities of the countershafts 36 and 37 are innerconnected by a cross-link or bar 49 which comprises a small sleeve 50 at one end and a large sleeve 51 at the opposite end integrally united with the strap 49 and sleeved over the countershafts 36 and 37. In the position shown in Figure 2 the sleeve 51 abuts as at 52 the outer edge of the hub portion 45 of the gear 39 and the short sleeve 50 is sleeved over the countershaft 36 and abuts against the outer side as at 53 of the sprocket 20. It will be appreciated that when the sprocket 20 is transferred to the shaft 37 the strap assembly 49 is rotated 180° and the sleeve 51 is mounted on the countershaft 36 and the sleeve 50 on the countershaft 37 whereupon the inner end of the sleeve 51 abuts against the outer edge 54 of the sprocket 43 while the sleeve 50 bears against the outer face of the sprocket 20. The free or outer extremities of the countershafts 36 and 37 are provided with apertures 55 and 56 respectively receiving removable keys 57 and 58 therethrough.

What is claimed is:

1. A power transmission mechanism comprising a driving shaft having a driving sprocket secured thereto, a driven shaft having a first sprocket secured thereto, a pair of countershafts parallel to said driving and driven shafts, a large diameter gear independently revolvable on one countershaft and having a plurality of axial threaded apertures, a small diameter gear independently revolvable on the other countershaft and meshing with said large diameter gear, a second sprocket revolvable on said other countershaft and constrained for rotation with said small diameter gear and having a plurality of axial threaded apertures, means drivingly connecting said first and second sprockets so that the first sprocket rotates in the same direction as the small diameter gear, said means including an endless sprocket chain driven by said second sprocket and trained about said first and second sprockets, a driven sprocket selectively connectible with said large diameter gear or said second sprocket for respectively driving said second sprocket at a higher speed in one direction through said gears or for driving said second sprocket directly at a slower speed, said driven sprocket having a plurality of apertures alignable with said apertures of either said second sprocket or said large diameter gear, a second endless sprocket chain drivingly connecting said driving and driven sprockets, and means to selectively interlock said driven sprocket with either said large gear or said second sprocket and comprising a plurality of threaded members insertable in the apertures of said driven sprocket and said apertures in either said large diameter gear or said input sprocket.

2. A power transmission mechanism comprising a driving shaft having a driving sprocket secured thereto, a driven shaft having a first sprocket secured thereto, a pair of countershafts parallel to said driving and driven shafts and each having a gear independently revolvable thereon and meshing with the other, a second sprocket connected to one of said gears, means drivingly connecting said first and second sprockets for rotation in the same direction, said means including an endless sprocket chain trained about said first and second sprockets, a driven sprocket selectively mountable on either of said countershafts, interlocking elements on the other of said gears, said second sprocket and said driven sprocket, means for selectively interlocking said elements of said driven sprocket and said second sprocket to drive said driven shaft in one direction and for disengaging said elements of said driven and second sprockets and engaging the elements of said other gear and driven sprocket for driving said driven shaft in the opposite direction, and means drivingly connecting said driving sprocket with the driven sprocket.

3. A power transmission mechanism comprising a driven shaft having a first sprocket constrained for rotation therewith, a pair of countershafts having first and second gears independently revolvable thereon and meshing with each other, a second sprocket constrained for rotation with the said first gear and having an interlocking element, an endless chain drivingly interconnecting said first and second sprockets for rotation in the same direction, a third sprocket selectively mountable for rotation on either countershaft, power transmitting means for rotating said third sprocket in one direction, said second and third sprockets and said second gear having interlocking elements, and means for interlocking said elements of said second and third sprockets upon attendant disposition of said third sprocket upon the countershaft carrying said second sprocket for transmitting power directly from said third to said second sprocket for rotating said driven shaft in one direction, and for disengaging said elements of said second and third sprockets and engaging the elements of said second gear and said third sprocket attendant to positioning of the latter upon the countershaft carrying said third sprocket to drive said driven shaft in an opposite direction.

4. A transmission mechanism for combined side delivery rake and tedder comprising a drive shaft having a driving sprocket secured thereto, a first countershaft having a first idler sprocket loosely mounted thereon, a second countershaft having a gear loosely mounted thereon, a gear loosely mounted upon said first countershaft and constrained for rotation with said first idler sprocket and meshing with the first mentioned gear, a second idler sprocket loosely mountable upon either countershaft, a reel shaft having a third sprocket secured thereto, an endless sprocket chain driven by said driving sprocket and trained about said second idler sprocket, an endless sprocket chain trained about said first and third sprockets for transmitting power from the first to the third, interconnecting means on said first and second sprockets and on said gear upon said second countershaft, and means selectively connecting the interconnecting means on said first and second sprockets or on said second sprocket and said last-mentioned gear attendant to disposition of said second sprocket upon said first or second countershaft, respectively.

5. A power transmission for a combined side delivery rake and tedder comprising a rotatable drive shaft having a driving sprocket disposed in driven relation thereto, a reel shaft having a first sprocket disposed in driving relation thereto, first and second countershafts, first and second meshing gears revolvably mounted thereon, respectively, a second sprocket revolvably mounted upon said first countershaft and constrained for rotation with said first gear, an endless chain trained about said first and second sprockets, a third sprocket having a selective independently revolvable first position upon said first countershaft and a second similar position upon said second countershaft, means selectively drivingly interconnecting said third and first sprockets in said first position of the former and said third sprocket and said second gear in said second position of said third sprocket, an endless chain trained about said third sprocket and said driving sprocket, and having a drive transmitting run extending substantially rectilinearly therebetween in either position of said third sprocket, said last-mentioned endless chain having a return run extending between said third and said driving sprockets, a spring loaded movable member comprising a third countershaft and an idler sprocket carried on said third countershaft and meshing with said return run in tensioning relationship thereto.

6. The combination according to claim 5 and said second gear being substantially larger than said first gear and said countershaft disposed a different distance from said driving shaft than said first countershaft whereby changing the length of said drive transmitting run and said return run against the yielding resistance of said spring loaded movable member, and means for locking said member in adjusted position.

7. In a transmission of the type described, a driving shaft having a driving sprocket secured thereto, mounting means having a pair of countershafts fixed thereto, first and second coupled power transmitting elements rotatably carried upon said first and second countershafts, respectively, a driven sprocket selectively positionable in a first position upon said first countershaft and in a second position upon the second countershaft, means selectively connecting said driven sprocket in said first position with said first element and in said second position with the second element, an endless sprocket chain trained about said driving and said driven sprockets and having loaded and return runs, said countershafts disposed to provide a rectilinearly extending loaded run of said chain between said sprockets in both positions of said driven sprocket, said first countershaft disposed a different distance to said driving shaft than said second countershaft, whereby said loaded run is of different length in said second than said first of said driven sprocket, said driven sprocket in said first position directly delivering higher torque at slow speed to said first element and in the second position delivering through said second elements reverse movement at higher speed and lower torque, a standard movably mounted upon said mounting means, a third countershaft carried by the standard, an idler sprocket rotatable upon said third countershaft and in meshing engagement with said return run, and spring means reacting between said standard and said mounting means urging said idler sprocket into stretching relation with said return run.

8. In a transmission of the class described, mounting means, a pair of countershafts covered at one end thereby, a pair of meshing gears revolvably mounted upon respective countershafts, an output sprocket revolvably mounted upon one of the countershafts and constrained for rotation with the adjacent gear, an input sprocket and having a first independently revolvable position upon one countershaft and a second independently revolvable position upon the other countershaft, means drivingly interconnecting said input and output sprockets in said first position and said input sprocket and gear on said other countershaft in the second position, and means interconnecting the opposite ends of said countershafts and comprising sleeves fitted upon respective countershafts, one of said sleeves being longer than the other and the axial extent thereof plus that of the gear upon said other countershaft being substantially equal to the additive axial dimensions of the other of said sleeves plus the input and output sprockets plus the other gear.

References Cited in the file of this patent

UNITED STATES PATENTS 2,539,028    Marsden _____ Jan. 23, 1951